Feb. 23, 1926.
O. C. REEVES
FRAME
Filed Oct. 20, 1922
1,574,112
2 Sheets-Sheet 1
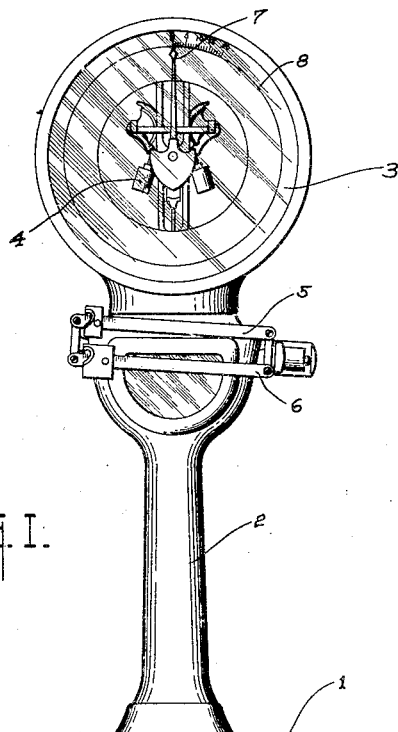
Fig. I.
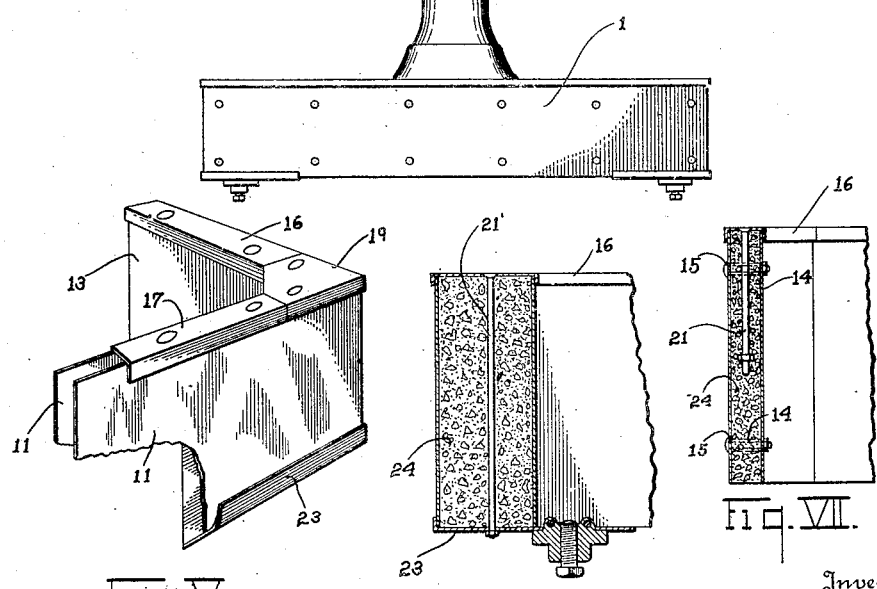
Fig. V.  Fig. VI.  Fig. VII.
Inventor
ORWELL C. REEVES.
By C. C. Marshall
Attorney

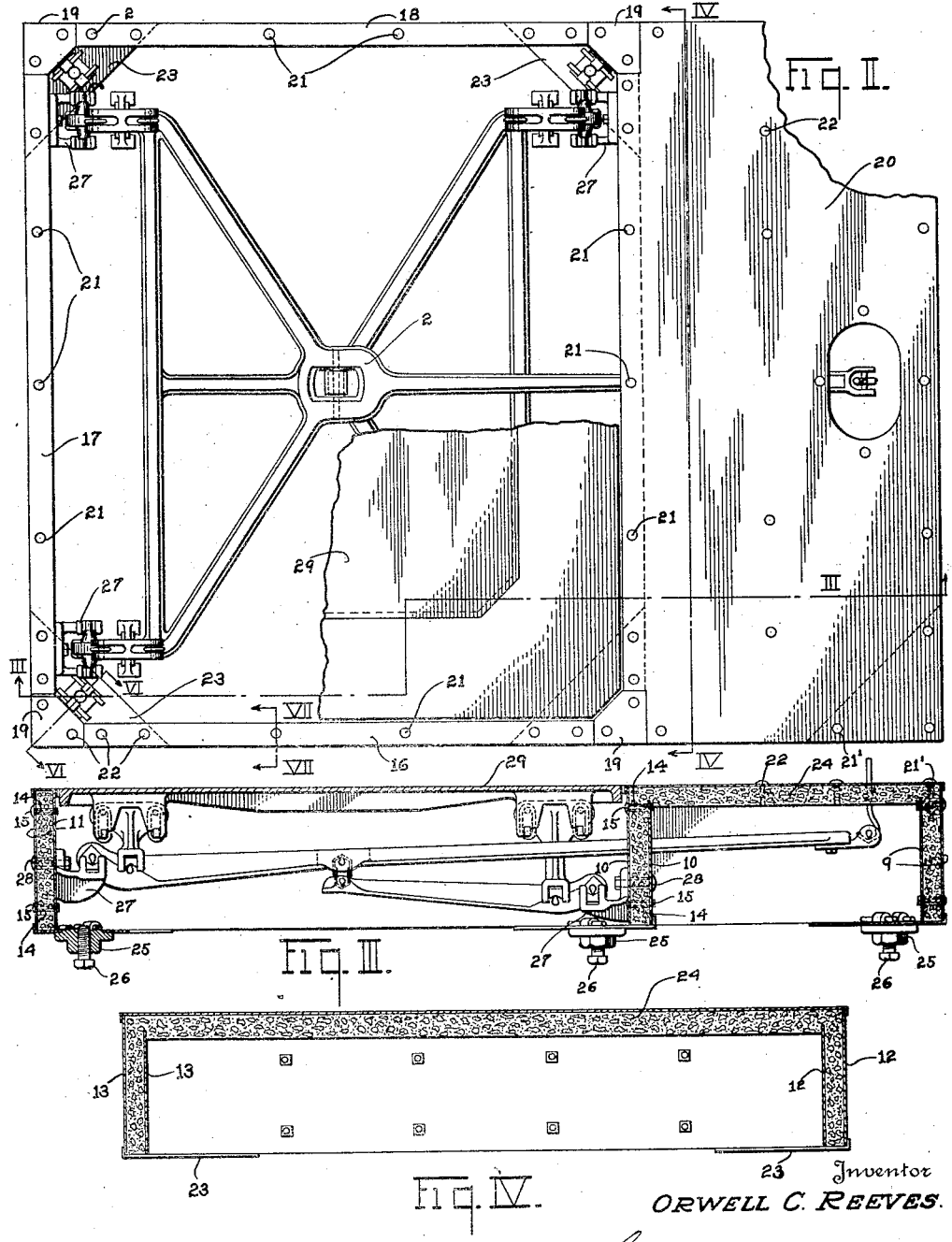

Patented Feb. 23, 1926.

1,574,112

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

FRAME.

Application filed October 20, 1922. Serial No. 595,763.

*To all whom it may concern:*

Be it known that I, ORWELL C. REEVES, a citizen of the United States, residing at Toledo, in the county of Lucas and State of Ohio, have invented certain new and useful Improvements in Frames, of which the following is a specification.

This invention relates to frames, and particularly to frames for weighing scales, and one of its principal objects is the provision of a structure of great rigidity.

Another object is the provision of a rigid structure which may be fabricated of inexpensive materials without the use of special machinery.

Another object of the invention is to provide a rigid scale frame adapted to so support the mechanism of the scale that the accuracy of the scale is not interfered with by deflection in the frame under heavy loads.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a platform scale embodying my invention;

Figure II is a plan view of the frame and platform lever mechanism of the scale, parts being broken away;

Figure III is a vertical sectional view taken substantially on the line III—III of Figure II;

Figure IV is a transverse vertical sectional view taken substantially on the line IV—IV of Figure II;

Figure V is a fragmentary view in perspective showing one corner of the frame;

Figure VI is a fragmentary sectional view taken substantially on the line VI—VI of Figure II; and Figure VII is a fragmentary sectional view taken substantially on the line VII—VII of Figure II.

Referring to the drawings in detail, I have shown my invention as embodied in a scale of the dormant or stationary type, but it is to be understood that the frame of my invention is also applicable to machines of other types.

In the embodiment shown, the base or frame 1 is adapted to house the platform lever mechanism and to support a column 2, at the upper end of which is mounted a substantially watch-case-shaped housing 3 within which is supported the automatic load-offsetting mechanism 4 of the scale. In the embodiment shown, the scale is also provided with tare and capacity beams 5 and 6, and the load offset by the automatic mechanism 4 is indicated by means of a hand 7 on a suitably graduated chart or dial 8. The specific weighing mechanism illustrated is not per se a part of my invention, and I have, therefore, described it only in general terms.

The metallic part of the frame 1 of the scale is a rectangular structure having double transversely-extending walls 9—9, 10—10 and 11—11 connected by double side walls 12—12 and 13—13, each of said walls being constructed of two comparatively thin sheets of metal spaced apart by tubular spacers 14 and held in place by bolts 15 which pass through the tubular spacers 14. Channel iron cover plates 16, 17 and 18 are fitted upon the upper edges of the walls 11—11, 12—12 and 13—13, and gusset plates with depending flanges are fitted upon the corners (see Figure V), while a sheet metal deck 20 having depending flanges is fitted over the walls 9—9 and 10—10 and the space between them. Bolts 21 are inserted at intervals through the channel iron cover plate 17 and extend into the space between the sheet metal members 11—11, 12—12 and 13—13, some of the bolts 21' being of sufficient length to extend beyond the lower edges of the walls, and short bolts 22 are similarly inserted at intervals through the deck 20 and extend into the space below the deck.

When the structure is assembled to the extent outlined above it is inverted and the space between the sheet metal sides 9—9, 10—10, 11—11, 12—12 and 13—13 of the walls, as well as the comparatively shallow portion of the space between the walls 9—9 and 10—10, is filled with concrete or similar material, the bolts 21, 21' and 22 being thereby embedded in the concrete. Gusset plates 23 are then secured in place at the corners of the frame by means of the bolts 21' which project beyond the surface of the concrete. When the concrete has hardened the frame so produced is very rigid and strong.

Brackets 25 into which are threaded screws 26 to serve as adjustable feet for the scale are fixed to the lower sides of the gusset plates 23. The lever mechanism of the scale is supported by fulcrum brackets 27 which are attached to the walls 10—10 and 11—11 by means of bolts 28, and a scale platform 29 which is supported by the levers lies substantially flush with the upper edges of the walls and the upper surface of the deck 20, so that articles to be weighed may be easily placed upon or removed from the scale platform.

The deck 20 which supports the column or cabinet containing the load-counterbalancing mechanism is made so rigid by the concrete filler that springing, which would occur even if the deck were made of quite heavy material, is prevented.

While it will be apparent that the illustrated embodiment of my invention herein shown is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a plurality of connected walls each constructed of spaced sheets of metal, the space between the sheets of each wall being filled with concrete-like material, the upper edge of each wall being provided with a cover plate, said cover plate being retained in place by bolts passing therethrough and having their shanks embedded in the concrete-like material, and gusset plates secured to said walls at their intersections.

2. In a device of the class described, in combination, a plurality of connected walls each constructed of spaced sheets of metal, the space between the sheets of each wall being filled with concrete-like material, the upper edge of each wall being provided with a cover plate, said cover plate being retained in place by bolts passing therethrough and having their shanks embedded in the concrete-like material, and fulcrum brackets for scale levers secured to certain of said walls.

3. In a device of the class described, in combination, a plurality of connected walls each constructed of spaced sheets of metal, the space between the sheets of each wall being filled with concrete-like material, the upper edge of each wall being provided with a cover plate, said cover plate being retained in place by bolts passing therethrough and having their shanks embedded in the concrete-like material, gusset plates secured to said walls at their intersections, and fulcrum brackets for scale levers secured to certain of said walls.

4. In a device of the class described, in combination, a plurality of connected walls each constructed of spaced sheets of metal, the space between the sheets of each wall being filled with concrete-like material, the upper edge of each wall being provided with a cover plate, said cover plate being retained in place by bolts passing therethrough and having their shanks embedded in the concrete-like material, and gusset plates secured to said walls at their intersections, said gusset plates being provided with adjustable feet for supporting said frame.

5. In a frame for weighing scales, in combination, a rectangular frame having end walls and side walls and a transversely-extending intermediate wall, each of said walls having spaced sheet metal sides, the space between said sides being filled with concrete-like material, a deck extending over the space between one of said end walls and said transverse intermediate wall, the upper side of said deck being formed by a sheet of metal, the body of said deck being formed of concrete-like material.

6. In a frame for weighing scales, in combination, a rectangular frame having end walls and side walls and a transversely-extending intermediate wall, each of said walls having spaced sheet metal sides, the space between said sides being filled with concrete-like material, a deck extending over the space between one of said end walls and said transverse intermediate wall, the upper side of said deck being formed by a sheet of metal, the body of said deck being formed of concrete-like material, the portions of said walls not covered by said deck being provided with cover plates, said deck and said cover plates being held in place by bolts passing therethrough, the shanks of said bolts being embedded in said concrete-like material.

7. In a device of the class described, in combination, a rectangular frame having end walls and side walls and a transversely-extending intermediate wall, each of said walls having spaced sheet metal sides, the space between said sides being filled with concrete-like material, a deck extending over the space between one of said end walls and said transverse intermediate wall, the upper side of said deck being formed by a sheet of metal, the body of said deck being formed of concrete-like material, and weighing mechanism supported by said deck and certain of said walls.

8. In a device of the class described, in combination, a rectangular frame having end walls and side walls and a transversely-extending intermediate wall, each of said walls having spaced sheet metal sides, the space between said sides being filled with concrete-like material, a deck extending over the space between one of said end walls and said transverse intermediate wall, the upper side of said deck being formed by a sheet of metal, the body of said deck being formed of concrete-like material, a column supported on said deck, weighing mechanism supported by said column, fulcrum brackets supported by certain of said walls, and platform lever mechanism supported by said fulcrum brackets, said platform lever mechanism being operatively connected with said weighing mechanism.

ORWELL C. REEVES.